United States Patent
Eckhardt et al.

(10) Patent No.: US 6,259,216 B1
(45) Date of Patent: Jul. 10, 2001

(54) CATHODE RAY TUBE

(75) Inventors: Wolfgang Eckhardt, Karlsruhe; Klaus Burkhardt, Kraichtal, both of (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/463,831
(22) PCT Filed: Jul. 29, 1998
(86) PCT No.: PCT/DE98/02161
  § 371 Date: May 15, 2000
  § 102(e) Date: May 15, 2000
(87) PCT Pub. No.: WO99/07008
  PCT Pub. Date: Feb. 11, 1999

(30) Foreign Application Priority Data

Aug. 1, 1997 (DE) .......................................... 297 13 767 U

(51) Int. Cl.$^7$ ................................................ G09G 1/04
(52) U.S. Cl. .............................. 315/379; 315/383; 315/85
(58) Field of Search ...................... 315/1, 379, 380–382, 315/383, 3, 185

(56) References Cited

U.S. PATENT DOCUMENTS

| | | | |
|---|---|---|---|
| 3,267,321 | 8/1966 | Gessford | 315/3 |
| 3,295,008 | 12/1966 | Gallaro et al. | 315/3 |
| 3,504,225 * | 3/1970 | Satoshi et al. | 315/31 |
| 3,863,096 * | 1/1975 | Sennik | 315/20 |
| 4,045,742 * | 8/1977 | Meehan et al. | 328/9 |
| 4,207,493 * | 6/1980 | Forster | 315/3 |
| 4,218,720 * | 8/1980 | Kam et al. | 361/93 |
| 4,600,859 * | 7/1986 | Beaumont | 315/3 |
| 5,231,332 * | 7/1993 | Beaumont et al. | 315/85 |
| 5,266,870 * | 11/1993 | Jang | 315/411 |

FOREIGN PATENT DOCUMENTS 29 37 299   10/1980   (DE) .
89 05 156    7/1990   (DE) .

OTHER PUBLICATIONS

Yuzuru Kobori et al., "A novel arc–suppression technique for cathode ray tubes", IEEE Transactions on Consumer Elektronics, vol. CE–26, Aug. 1980.
Patent Abstracts of Japan, vol. 009, No. 049 (E–300) Mar. 2, 1985 & JP 59 191241 A (Sanyo Denki KK, others: 02) Oct. 30, 1984.
Smith, "Protecting a cathode–ray tube during internal arcing", IBM Technical Disclosure Bulletin, vol. 13, No. 12, May 1971.

* cited by examiner

Primary Examiner—Don Wong
Assistant Examiner—Tuyet T. Vo
(74) Attorney, Agent, or Firm—Staas & Halsey LLP

(57) ABSTRACT

A cathode ray tube is described having at least one electron gun including a cathode, a control grid, and a focusing unit, and a strip made of electrically conductive material applied to the cathode ray tube in parallel to the outer coating of the tube and connected to ground potential. Means and measures are provided to eliminate harmful effects of high-voltage sparkovers. The cathode ray tube may be is used, for example, in monitors.

4 Claims, 1 Drawing Sheet

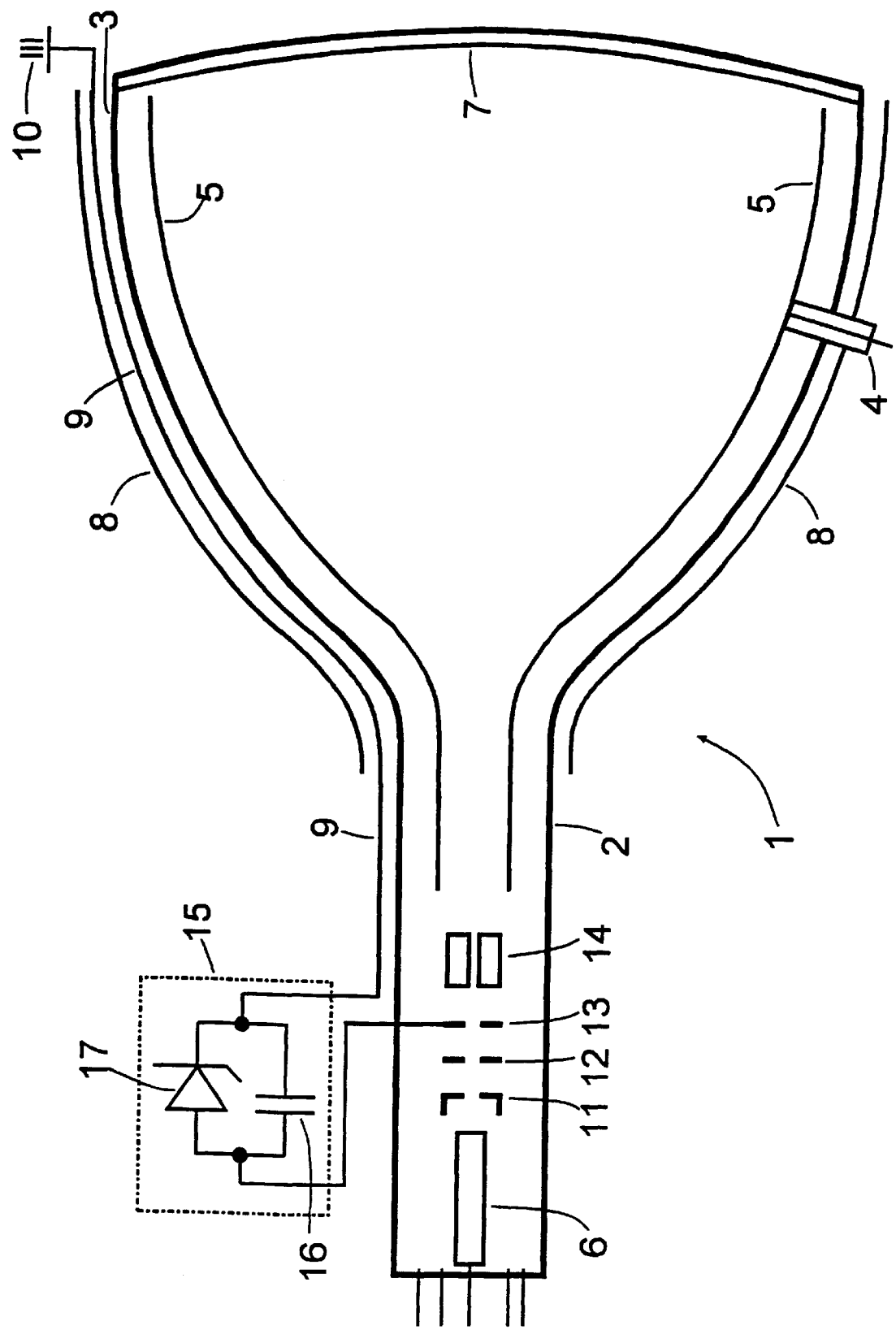

CATHODE RAY TUBE

FIELD OF THE INVENTION

The present invention relates to a cathode ray tube having at least one electron gun including a cathode, a control grid and a focusing unit, and a strip made of electrically conductive material applied to the cathode ray tube in parallel to the outer coating of the cathode ray tube and connected to ground potential.

BACKGROUND INFORMATION

Undesirable high-voltage sparkovers can occur in cathode ray tubes of monitors; such sparkovers are caused by increased field intensities between the focusing unit and the anode, i.e., the inner coating of the tube or by impurities in the tube. Depending on the type of tube and the level of anodic voltage, very high currents may flow within very short times, permanently damaging the monitor electronics. Furthermore, these currents generate magnetic fields that induce voltages in the electronic components close to the tube. This creates the hazard of permanent damage to these components as well.

Circuit design measures can largely reduce the effect of a high-voltage sparkover. In this case, the amplitude of the current during sparkover is usually reduced using series resistors. These protective measures, however, limit the video band width of the monitor, with the result that high image resolutions, e.g., resolutions of up to 4000 lines for band widths of up to 600 MHz, are difficult to implement.

One cathode ray tube is described in German Utility Model 89 05 156. In order to reduce the damaging effects from high-voltage sparkovers, this German Utility Model describes a strip made of electrically conductive material and connected to ground potential be applied is parallel with the inner coating to the outer coating of the cathode ray tube. In the event of a high-voltage sparkover, which usually occurs between the anode and the focusing unit of the tube, the current flows in the tube via the focusing unit, the screen grid, the control grid, the cathode, and the cathode heater to ground, these elements, particularly the cathode and the outer protective circuit of the monitor electronics, being subject to damage.

SUMMARY

An object of the present invention is to provide a cathode ray tube in which the harmful effects of high-voltage sparkovers can be largely eliminated.

It is advantageous that, with the cathode ray tubes according to the present invention, monitors having a high video band width can be designed.

The current induced by a high-voltage sparkover flows away via the focusing unit, which, in "normal" monitor operation, works with a focusing voltage of approximately 7 kV, the additional grid, via the voltage limiting means or directly to the strip and to the outer coating. The high-voltage sparkover has no effect on the screen grid and control grid, on the cathode, the cathode heater and the monitor electronics.

In one embodiment of the present invention the strip is a copper or aluminum foil. This foil is applied directly to the glass surface of the tube. Thus, a connection is created that is parallel to the tube axis and forms a conductive loop having a very small current linkage surface, so that in the event of a high-voltage sparkover, the induced voltage is also small. In the event where the glass bulb of the tube is already provided with an outer coating, e.g., in the form of a graphite coating, the foil can be applied to this coating.

In another embodiment of the present invention, the voltage limiter is implemented using simple circuit design means and include a capacitor and a Zener diode connected in parallel thereto.

In another embodiment of the present invention the, the diameter of the additional grid is approximately equal to the inner diameter of the tube neck. Thus, the cathode and the control grid are properly shielded from the focusing unit, which is usually at a high potential.

The present invention is now explained in greater detail with reference to one embodiment illustrated in the single figure of the drawing.

BRIEF DESCRIPTION OF THE DRAWING

The FIGURE is a schematic drawing of components of a cathode ray tube according to the present invention.

DETAILED DESCRIPTION

A glass bulb 1 of the cathode ray tube includes a tube neck 2 and a funnel-shaped part 3, which is provided with an anode terminal 4. An inner coating of glass bulb 1 includes an electrically conductive coating, e.g., an aluminum layer 5, which is used to conduct away the electrons emitted by a cathode 6 onto a photosensitive layer 7, and an outer graphite coating 8. Graphite layer 8 and aluminum layer 5 form a capacitor, which is used for smoothing the anodic voltage. A narrow strip 9 made of electrically conductive material, preferably a 1 cm wide copper or aluminum foil, is glued directly onto glass bulb 1, graphite layer 8 being applied to this strip in the area of funnel-shaped part 3 of glass bulb 1. Strip 9 is connected to a grounding terminal 10. An electron gun, including cathode 6, a control grid 11, a screen grid 12, and a focusing unit 14, is arranged in tube neck 2, another grid 13, closest to focusing unit 14 in the direction of cathode 6, is connected via the shortest possible path to strip 9 via a voltage limiter 15. In the present example, it is assumed that the operating potential of grid 13 is less than 0 V. In the case where the operating potential is greater than 0 V, grid 13 is also connected to strip 9 via voltage limiter having a suitably polarized Zener diode and, if the operating potential at grid 13 is 0 V, grid 13 is directly connected to strip 9. In ordinary monitors, existing screen grid 12, supplied with approx. 500 V, is the closest grid to focusing unit 14 in the direction of cathode 6. In this case, this screen grid 12 can be connected to strip 9 via voltage limiter 15. A current induced by a high-voltage sparkover flows away in the present example from the inner coating, i.e., aluminum layer 5, via focusing unit 14, grid 13, via voltage limiter 15 and strip 9 to outer coating 8, voltage limiter 15 having, in the simplest case, a capacitor 16 and a Zener diode 17 connected in parallel thereto.

What is claimed is:
1. A cathode ray tube, comprising:
   a bulb;
   a strip of electrically conductive material connected to ground potential, the strip being applied to the bulb; and
   at least one electron gun including a cathode, a control grid downstream from the cathode, a screen grid downstream from the control grid, a focusing unit down stream from the screen grid, and an additional grid arranged between the screen grid and the focusing unit, the additional grid being directly connected to the strip when an operating potential at the additional grid is 0 V, the additional grid being coupled to the strip via a voltage limiter when the operating potential is not 0 V.

2. The cathode ray tube according to claim 1, wherein the strip is one of copper and aluminum foil.

3. The cathode ray tube according to claim 1, wherein the voltage limiter includes a capacitor connected in parallel to a Zener diode.

4. The cathode ray tube according to claim 1, wherein a diameter of the additional grid is approximately equal to an inner diameter of a tube neck.

* * * * *